United States Patent [19]

Hinz et al.

[11] Patent Number: 4,773,633

[45] Date of Patent: Sep. 27, 1988

[54] HELICAL SPRING AND PROCESS FOR PRODUCING IT

[75] Inventors: Bernhard Hinz, Frankfurt; Walter Steigleder, Stuttgart, both of Fed. Rep. of Germany

[73] Assignee: Deutsche Forschungs- und Versuchsanstalt Fur Luft- und Raumfahrt e.V., Bonn, Fed. Rep. of Germany

[21] Appl. No.: 832,750

[22] Filed: Feb. 20, 1986

[30] Foreign Application Priority Data

Feb. 21, 1985 [DE] Fed. Rep. of Germany ....... 3506037

[51] Int. Cl.$^4$ .................. F16F 1/36; F16F 1/06; B32B 31/00; B29D 28/00
[52] U.S. Cl. ......................... 267/148; 156/86; 156/155; 156/186; 264/103; 267/166
[58] Field of Search ............... 267/148, 149, 166, 167, 267/180, 286; 251/902; 264/165, 166, DIG. 40, 103, 257; 242/7.02, 7.01, 7.23; 156/86, 155, 186, 195; 428/605

[56] References Cited

U.S. PATENT DOCUMENTS

| | | | |
|---|---|---|---|
| 2,542,593 | 2/1951 | Sullivan | 267/180 X |
| 2,852,424 | 9/1958 | Reinhart et al. | 267/149 X |
| 2,928,964 | 3/1960 | Jones | 156/185 X |
| 4,090,002 | 5/1978 | Rosenblum | 264/257 X |
| 4,260,143 | 4/1981 | Kliger | 267/166 X |
| 4,383,877 | 5/1983 | LaValley | 156/155 |
| 4,559,700 | 12/1985 | Sugalski et al. | 242/7.02 X |

FOREIGN PATENT DOCUMENTS

| | | | |
|---|---|---|---|
| 0236781 | 9/1960 | Australia | 264/281 |
| 2334971 | 1/1975 | Fed. Rep. of Germany. | |
| 3000520 | 7/1980 | Fed. Rep. of Germany. | |
| 3031582 | 3/1982 | Fed. Rep. of Germany | 267/149 |
| 0144837 | 8/1984 | Japan | 267/149 |

OTHER PUBLICATIONS

*Product Engineering*, Jun. 1956, pp. 183-186, by Reinhart et al., *Product Engineering*, 'Jun. 1956, pp. 183-186, by Reinhart et al., "Plastic Springs".

Primary Examiner—Andres Kashnikow
Assistant Examiner—Robert J. Oberleitner
Attorney, Agent, or Firm—Wolf, Greenfield & Sacks

[57] ABSTRACT

To increase the strength of a helical spring with a spring wire made of thermosetting plastic in which reinforcing fibers are embedded that run at an angle of approximately ±45° to the longitudinal axis of the spring wire, the fibers are present as a fabric that is wound helically around the longitudinal axis of the spring wire, with the warp and woof threads being at an angle of approximately 45° to the longitudinal axis. A process is also proposed for producing such helical springs.

9 Claims, 2 Drawing Sheets

HELICAL SPRING AND PROCESS FOR PRODUCING IT

BACKGROUND OF THE INVENTION

This invention concerns a helical spring with a spring wire made of thermosetting plastic in which are embedded reinforcing fibers that run at an angle of approximately 45° to the longitudinal axis of the spring wire.

The invention also concerns a process for producing such a helical spring in which a spring wire made of a thermosetting resin and reinforcing fibers embedded in it are wound into a helical spring and the resin is then cured.

Helical springs are frequently used in machinery elements that maintain the force fit between two elements in motion or in case of wear. The motion of an element leads to the motion of the spring in the same direction, which causes large inertial forces, particularly in case of high-frequency oscillations and high-amplitude vibrations. To keep these inertial forces small, the mass of the helical spring should be as small as possible.

For this reason, attempts have been made to make helical springs of fiber composite materials, particularly of carbon fiber-reinforced plastic, since mass reductions of up to 70% are possible with this material. Such springs are built up in layers of carbon fiber rovings wound at an angle of 45° to the longitudinal axis of the spring wire. High mechanical and thermal stresses are produced during this buildup, because of which breakage or creeping of the fibers can occur (U.S. Pat. No. 4,260,143).

It is the purpose of this invention to produce a helical spring made of fiber composite material of this type, particularly of carbon fiber-reinforced plastic, that has strength characteristics that are improved over those of the helical springs of this type known heretofore.

SUMMARY OF THE INVENTION

This problem is solved pursuant to the invention in a helical spring of the type mentioned initially by the fact that the fibers are present as a fabric that is wound helically around the longitudinal axis of the spring wire, with the warp and woof threads being at an angle of approximately ±45° to the winding axis.

It has turned out that in the case of a torsion stress of such a spring wire, which occurs during the compression and stretching of a helical spring, the helically wound fabric layer absorbs the radial forces occurring.

In a preferred form of embodiment, the fabric is cut rectangularly with the cut edges forming an angle of approximately ±45° with the warp and woof threads. The fabric also extends over the entire length of the spring wire.

In another form of embodiment, the fabric is cut in strips with the cut edges running parallel or perpendicular to the warp and woof threads. These strips are wound up at an angle of approximately 45° to the longitudinal axis of the spring wire.

It is beneficial if the inner end of the fabric is stretched between two filamentary or rod-shaped retainers running over the entire length of the spring wire, around which the next layers of the fabric are wound.

The basic purpose of the invention, furthermore, is to describe a simple process for producing such a helical spring.

This is solved pursuant to the invention in a process of the type described at the outset, by stretching a fabric made of the reinforcing fibers saturated with the thermosetting resin between two filamentary or rod-shaped retainers to produce the spring wire prior to winding the helical spring, so that the retainers make an angle of approximately 45° with the warp and woof threads, and by rotating the retainers together around a winding axis running between the retainers and parallel to them, so that the fabric is wound up on the retainers as on a winding core. Reinforcing fibers that remain in the spring wire can preferably be used as retainers.

In another form of embodiment, the retainers can be pulled out of the spring wire parallel to its longitudinal axis after it is produced.

It is beneficial if tubing is drawn over the spring wire prior to forming the spring; the shape of the still uncured spring wire can be fixed in this way.

It is particularly beneficial here if shrinkable tubing is drawn over the spring wire and this is shrunk by heating during the curing of the thermosetting resin. The shrinkable tubing on all sides presses excess resin out of the spring wire and prevents cracks from forming during the curing because of the shrinkage of the material.

In order to be able to drive air inclusions effectively out of the still uncured spring wire, it is beneficial to heat the shrinkable tubing progressively along the spring wire for the shrinkage.

The helical springs are preferably tempered after the curing.

The tubing can be eliminated by thermal or chemical decomposition or by dissolving after the curing of the helical springs, for which it is particularly beneficial to use a shrinkable tubing that is thermally decomposed at the tempering temperature of the helical springs.

The description below of preferred forms of embodiment of the invention provides a more detailed description in combination with the drawing. The drawing shows:

DESCRIPTION OF THE PREFERRED EMBODIMENTS

Figure 1:
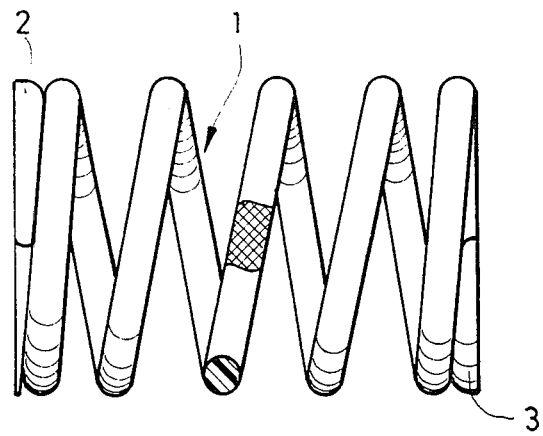
FIG. 1: A helical spring made of a fiber-reinforced plastic with a fabric interlayer.
Figure 2:
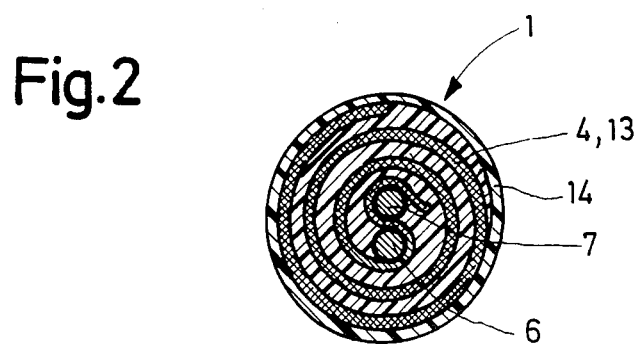
FIG. 2: A view in cross section of the spring wire surrounded by tubing.

The helical spring illustrated in FIG. 1 that can be used as a valve spring for a diesel engine, for example, has a helically wound spring wire 1 that forms a dead turn 2 and 3 at each of the two ends of the sprirg. The spring wire 1 consists of a fiber-reinforced, thermosetting resin and is made in the way shown in FIGS. 3 and 4.

Figure 3:
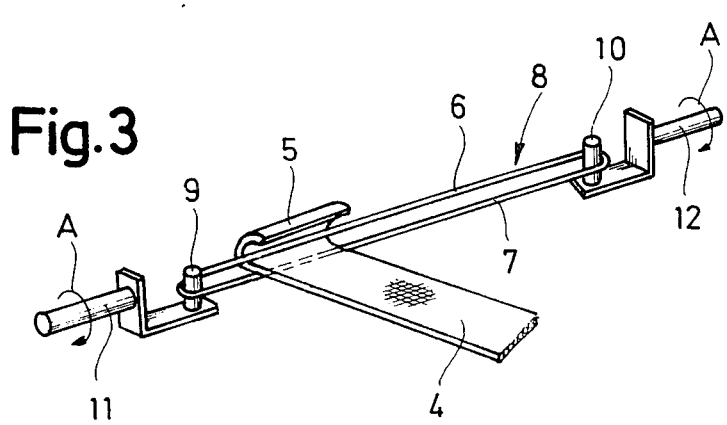
FIG. 3: A first arrangement for winding a fabric interlayer in strips.

In the example of embodiment shown in FIG. 3, a fabric strip 4 made of reinforcing fibers, for example of carbon fibers, is stretched between two filamentary retainers 6, 7. These retainers 6, 7 are formed by a loop 8 of endless fibers that is drawn over two retaining lugs 9 and 10 placed at a distance from one another, so that the two halves of the loop run parallel to one another with a small separation between the two retaining lugs 9 and 10. The retaining lugs are each mounted on shafts 11 and 12 that extend in extension of the line joining the two retaining lugs 9 and 10 so that the retaining lugs together with the loop 8 stretched on them can rotate around a winding axis that extends between the retainers 6 and 7 and parallel to them.

The fabric strip 4 is cut so that the directions of the warp and woof threads run parallel or perpendicular to the outer contour of the strip. The end 5 of the fabric strip 4 is inserted between the two retainers 6 and and is rotated by 45° in its plane relative to the winding axis, so that when the shafts 11 and 12 rotate along with the retaining lugs 9 and 10 fastened to them, the fabric strip 4 is wound up at an angle of 45° on the retainers 6 and 7 acting as a winding core.

Figure 4:
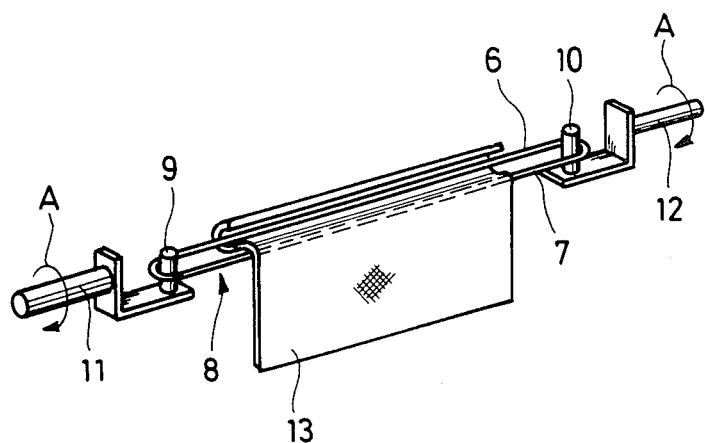
FIG. 4: A view similar to FIG. 3 of a device for winding a rectangularly cut fabric interlayer extending over the entire length of the spring wire.

In the example of embodiment of FIG. 4, a rectangularly cut piece of fabric 13 whose warp and woof threads run at ±45° to the cut edges is inserted by one end between the retainers 6 and 7, with the cut edges of the piece of fabric running parallel or perpendicular to the winding axis. The piece of fabric in this case extends over the entire length of the spring wire to be produced. In this case, the rectangular piece of fabric 13 is wound up on the retainers 6 and 7 acting as the winding mandrel by rotation of the shafts 11 and 12.

In both cases, the piece of fabric has been saturated with a thermosetting resin prior to the winding, so that adjacent layers of the fabric after the winding are joined to one another by the thermosetting resin escaping from the fabric.

After winding up the strip of fabric 4 or the piece of fabric 13, the spring wire 1 thus obtained is drawn into a shrinkable tube 14. This can be done, for example, by putting a traction thread through such a shrinkable tube, that is drawn through the loop 8. In this way, the loop 8 with the resin-impregnated fabric wound on it can be pulled into the shrinkable tubing 14. Because of the shrinkable tubing, it is possible to handle this structure of wound. resin-impregnated fabric even though the resin is not yet cured. Prior to the actual curing process, the shrinkable tubing 14 is then shrunk by heating, preferably progressively along the tubing, or progressively from the center of the tubing toward the two ends. so that the spring wire still uncured inside the shrinkable tubing is compressed. This drives out air inclusions and excess resin, with the process being promoted by the progressive heating of the shrinkable tubing. The still uncured spring wire enclosed in the shrinkable tubing is then wound on a form into the desired helical spring. The form preferably has circumferential grooves with a semicircular cross section for this purpose, so that the spring wire is not flattened out on the winding core in the contact area, but is given a circular cross section. However, it is also Possible to wind up the spring wire on a cylindrical winding core if a slight flattening on the inside is not a problem.

After being wound on the winding core, the helical spring is cured at an elevated temperature, with the shrinkable tubing guaranteeing that no curing cracks can form from shrinkage of the material during the curing phase.

After the curing of the helical spring, the core is removed. This can be done by taking apart the multipart core in such a way that the separate parts can be removed from the helical spring toward the inside.

The cured helical spring removed from the core is then also tempered, to aftercure the helical spring and to increase its hot strength.

This final heat treatment can also be used to eliminate the shrinkable tubing by thermal decomposition or by melting it off.

It has been found that shear forces occurring from the helical structure and the use of reinforcing fibers arranged in the form of fabric can also be transferred from the fibers positively in the radial direction. Because of the homogeneous fabric orientation, only small thermal stresses are transferred between adjacent fabric layers.

An example of a thermosetting plastic material that can be used is an epoxy resin; it is particularly beneficial to use a mixture of triglycidyl isocyanurate (TGIC) and methylnadic anhydride (MNSA).

Conventional fibers, particularly carbon fibers or glass fibers, can be used as the fiber material for plastic-fiber composites. However, the helical springs can also be produced from carbon.fiber reinforced carbon.

The shrinkable tubing can consist of polyolefins, for example.

Impregnation is ordinarily done with excess resin. The excess resin can be driven out by the shrinkable tubing, so that an increase of fiber content occurs until a fiber volume fraction of approx. 50% is reached. The shrinkable tubing can have an initial inside diameter of 9.5 mm, for example, that is lowered to a value of approx. 5.5 mm by heating to 110° C., for example. At the same time, this gives the spring wire a circular cross section. Heating the shrinkable tubing at the same time also heats the fiber composite spring wire, with the viscosity of the resin being reduced. Thus, the excess resin can flow out of the shrinkable tubing particularly effectively, with the air inclusions contained in it.

The resin can be cured, for example, by first heating the spring wire for two hours at 150° C. and then for 16 hours at 220° C.

In the following tempering, for example, the helical spring can be heated for 6 hours to 260° C.

The loop 8, for example, can be made of Aramid fibers. It is then beneficial to leave the loop in the spring wire.

Basically, the use of other retainers would also be possible, for example two parallel wires, but they would then have to be pulled out of the spring wire before winding it into a helical spring. A compact structure of the spring wire is obtained because of the shrinkable tubing, even after withdrawing the retainers.

We claim:

1. In a helical spring formed of a spring wire made of thermosetting plastic in which reinforcing fibers are embedded in the plastic, the improvement comprising
   a pair of filamentary retainers that extend over the entire length of the spring wire,
   said fibers running at an angle of approximately ±45° to the longitudinal axis of the spring wire, the fibers being present as a fabric that is wound helically around the longitudinal axis of the spring wire, with the warp and woof threads being at an angle of approximately 45° to the longitudinal axis, and
   wherein the inner end of the fabric is stretched between said two filamentary retainers around which the next layers of the fabric are wound.

2. Helical spring pursuant to claim 1, wherein the fabric is cut rectangularly with the cut edges being at an angle of approximately ±45° to the warp and woof threads, and the fabric extends over the entire length of the spring wire.

3. Helical spring pursuant to claim 1, wherein the fabric is cut in rectangular strips with two opposing edges running parallel and the other two edges perpendicular to the warp and woof threads, and the strip is wound at an angle of approximately 45° to the longitudinal axis of the spring wire.

4. Process for producing a helical spring with a spring wire made of a thermosetting resin and reinforcing fibers embedded in it running at an angle of approximately ±45° to the longitudinal axis of the spring wire, which is wound into a helical spring and the resin is then cured, wherein prior to the winding of the helical spring, a fabric made of the reinforcing fibers saturated with the thermosetting resin is stretched between two filamentary or rod-shaped retainers so that the retainers make an angle of approximately 45° with the warp and woof threads of the fabric, and the retainers are rotated together with a winding shaft parallel to them so that the fabric is wound up on the retainers as on a winding core, said retainers being two of said reinforcing fibers that remain in said spring wire after said stretching, winding and curing.

5. Process pursuant to claim 4, wherein tubing is drawn over the spring wire prior to winding the spring.

6. Process pursuant to claim 5, wherein shrinkable tubing is drawn over the spring wire and is shrunk by heating during the setting of the thermosetting resin.

7. Process pursuant to claim 6, wherein the shrinkable tubing is heated progressively along the spring wire to shrink it.

8. Process pursuant to claim 5, wherein the tubing is eliminated after the curing by a process selected from the group consisting of thermal decomposition and chemical decomposition or dissolving.

9. Process pursuant to claim 4, wherein the helical spring is tempered after being cured.

* * * * *